US006793385B2

(12) United States Patent
Tiesler et al.

(10) Patent No.: US 6,793,385 B2
(45) Date of Patent: Sep. 21, 2004

(54) ASSIST HANDLE WITH INTEGRATED LIGHT UNIT

(75) Inventors: John M. Tiesler, Harrison Township, MI (US); Shu-Hsiung Chou, Rochester Hills, MI (US); Richard Alan Mazza, Sterling Heights, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/289,865

(22) Filed: Nov. 7, 2002

(65) Prior Publication Data

US 2004/0109324 A1 Jun. 10, 2004

(51) Int. Cl.⁷ ................................................ B60Q 1/26
(52) U.S. Cl. ...................... 362/501; 362/206; 362/295; 362/311; 362/399
(58) Field of Search ................................ 362/295, 501, 362/399, 311, 206

(56) References Cited

U.S. PATENT DOCUMENTS

| | | | | |
|---|---|---|---|---|
| 4,686,609 A | * | 8/1987 | Dykstra et al. | 362/490 |
| 4,733,337 A | * | 3/1988 | Bieberstein | 362/206 |
| 4,788,630 A | | 11/1988 | Gavagan | |
| 4,841,417 A | * | 6/1989 | Maglica et al. | 362/206 |
| 4,905,129 A | * | 2/1990 | Sharrah | 362/158 |
| 4,939,628 A | * | 7/1990 | Wang | 362/206 |
| 5,025,352 A | | 6/1991 | Brown | |
| 5,297,010 A | * | 3/1994 | Camarota et al. | 362/501 |
| 5,366,127 A | * | 11/1994 | Heinz | 224/313 |
| 5,697,693 A | * | 12/1997 | Wittkopp et al. | 362/490 |
| 5,991,976 A | * | 11/1999 | Adams et al. | 16/444 |
| 6,000,822 A | | 12/1999 | Polizzi et al. | |
| 6,158,796 A | | 12/2000 | Weber | |
| 6,164,805 A | | 12/2000 | Hulse | |
| 6,231,204 B1 | * | 5/2001 | Lo | 362/118 |
| 6,234,570 B1 | | 5/2001 | Quinno et al. | |
| 6,283,621 B1 | * | 9/2001 | Macri | 362/488 |
| 6,331,066 B1 | * | 12/2001 | Desmond et al. | 362/494 |
| 6,523,888 B1 | * | 2/2003 | Yan et al. | 296/215 |
| 6,550,946 B2 | * | 4/2003 | Misawa et al. | 362/501 |
| 6,553,629 B2 | * | 4/2003 | Grady et al. | 16/444 |
| 6,619,818 B2 | * | 9/2003 | Grove | 362/267 |
| 6,648,477 B2 | * | 11/2003 | Hutzel et al. | 359/604 |
| 6,701,995 B1 | * | 3/2004 | Bogdanski | 160/127 |
| 2001/0006465 A1 | | 7/2001 | Misawa et al. | |
| 2002/0030988 A1 | * | 3/2002 | Stapf | 362/85 |

FOREIGN PATENT DOCUMENTS

| | | |
|---|---|---|
| EP | 0 074 027 | 3/1983 |
| JP | 11-208277 | 8/1999 |

* cited by examiner

Primary Examiner—Thomas M. Sember
Assistant Examiner—Jacob Y. Choi
(74) Attorney, Agent, or Firm—Bill C. Panagos

(57) ABSTRACT

The assist handle includes an elongated handle body having opposed ends and an attachment portion extending from each of the opposed ends. Each of the attachment portions is adapted to be attached to the surface of the vehicle interior. The handle body carries a light unit, which is operable to provide illumination to the vehicle interior. Preferably, the handle body is adapted to be hingedly attached to the vehicle interior surface and the light unit is incorporated as a part of the handle body.

15 Claims, 4 Drawing Sheets

ASSIST HANDLE WITH INTEGRATED LIGHT UNIT

BACKGROUND OF THE INVENTION

The present invention relates generally to automotive vehicle interior components and accessories and, in particular, to an assist handle for a vehicle interior having an integrated light unit.

Assist or grab handles, which are utilized by passengers for support when the passengers enter and exit an automotive vehicle, are well known. Assist handles are typically fixed to a surface in the vehicle interior, such as the roof of the vehicle adjacent the sides of the headliner, or are hingedly attached to the interior surface. Vehicle reading and courtesy light units or light assemblies, which are utilized to provide illumination for single occupants of the vehicle, are also well known. Prior art reading and courtesy light units, however, require an additional mounting aperture in the vehicle interior surface. It is known to provide light assemblies adjacent to an assist handle, which sometimes share a common covering or mounting plate. However, these combination assist handles and light assemblies require additional components and another mounting aperture for the light assembly in the interior surface adjacent the assist handle. The demand for more compact yet functional interior components and accessories continues to increase.

It is desirable, therefore, to provide an assist handle that functions as an assist handle and also includes a light assembly incorporated in the handle body for providing illumination to the occupant of the vehicle. It is also desirable to reduce the number of mounting apertures required for interior accessories in the vehicle interior surface.

SUMMARY OF THE INVENTION

The present invention concerns an assist handle assembly that is adapted to be attached to a surface of a vehicle interior. The assist handle assembly includes an elongated handle body having opposed ends and an attachment portion extending from each of the opposed ends. Each of the attachment portions is adapted to be attached to the surface of the vehicle interior. The handle body carries a light unit, which is operable to provide illumination to the vehicle interior. Preferably, the handle body is adapted to be hingedly attached to the vehicle interior surface and the light unit is incorporated into the handle body.

The light unit or light assembly preferably includes a housing, a first member slidably disposed in the housing and movable in a first linear direction, and a second member rotatably mounted relative to said housing. A contact member is fixed relative to the second member and a light source is attached to the contact member. The light source is operable to provide illumination to the vehicle interior when activated. A lead frame is connected to the contact member and to an electrical power supply. Movement in the first direction by the first member causes a rotational movement of the second member and the contact member, which alternately activates and deactivates the light source by alternately supplying electrical power to the light source through the contact member. Preferably, the light unit or light assembly includes a lens or translucent member to direct the light from the light source to a specific portion of the vehicle interior. Preferably, the light unit or the light assembly is an LED board having an LED light source attached thereto. Alternatively, the light unit is an incandescent light bulb attached thereto. Preferably, the light unit is carried by one of the attachment portions and a portion of the attachment portion is defined by the translucent member. Alternatively, the light assembly is carried by the handle body intermediate the opposed ends. Preferably, the light unit is connected to the electrical power supply by an electrical wire routed through a hinge that is adapted to carry the wire without the deforming the wire.

The lens or translucent member preferably provides structural support and strength to the handle body while allowing the light assembly to occupy less space in the vehicle interior, allowing the use of fewer parts than the prior art. Preferably, the translucent member of the light unit is mounted flush with the handle body. Alternatively, the translucent member of the light unit extends outwardly from the handle body.

The present invention advantageously provides fewer parts with less weight and reduces the complexity of the interior component assembly by providing an integrated assist handle and light unit. The light assembly or light unit can be advantageously located at any point along the handle body, providing light to any number of locations within the vehicle interior. The housing can be shaped advantageously to fit any number of profiles.

The present invention can utilize any suitable switch button mechanism to activate and deactivate the light unit or light assembly. For example, the switch button could be mounted on the handle or exterior to the handle. Alternatively, movement of the hinged handle body operates the light unit regardless of the action or position of the push button.

The present invention provides a fully functioning assist handle that advantageously includes the capability for providing illumination to the occupant of the vehicle without the need to provide an additional light assembly with an associated mounting aperture in the interior surface, such as a headliner of the vehicle. In addition, the light unit or light assembly advantageously provides a light source that occupies a small amount of space within the vehicle interior.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
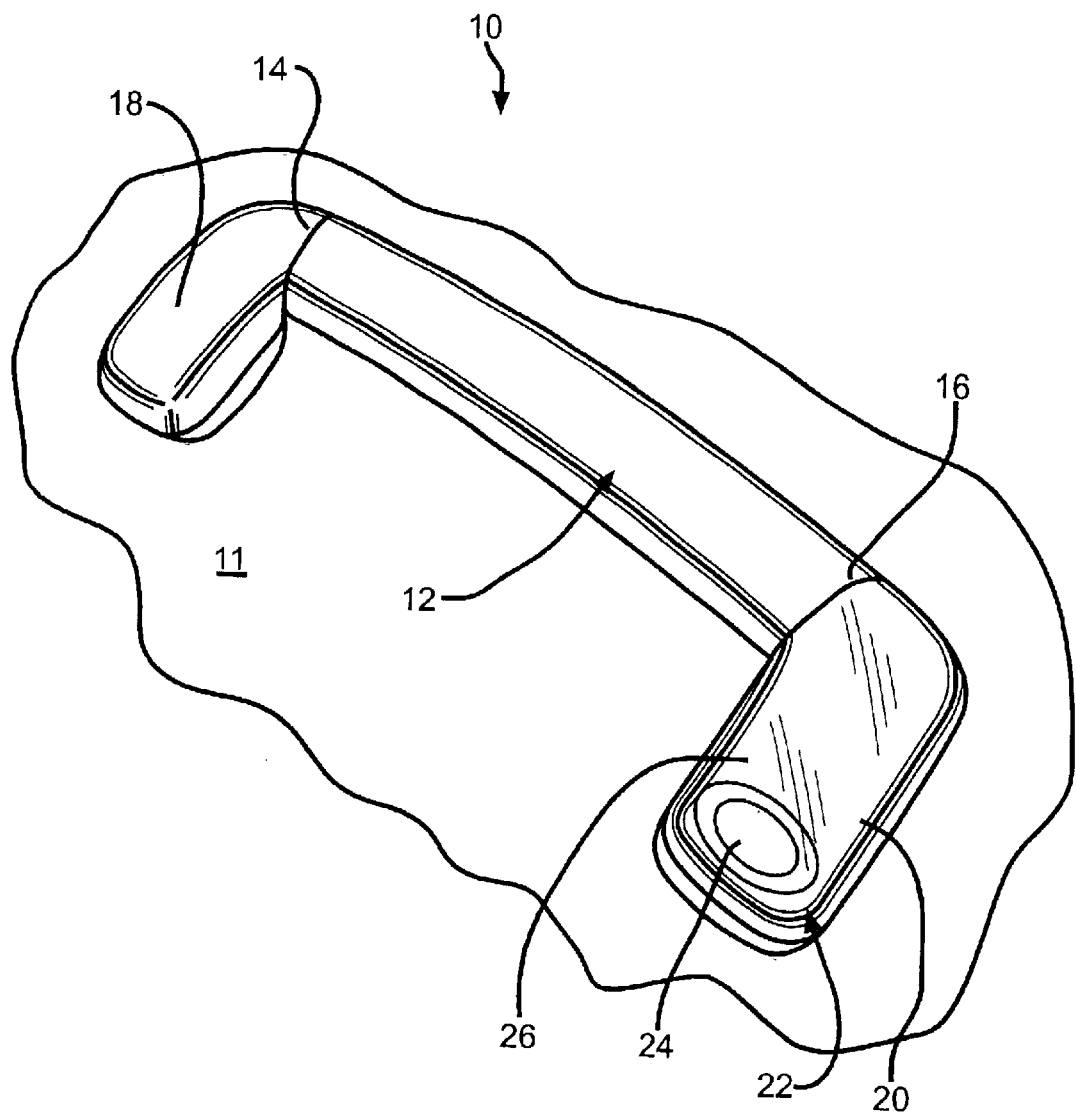
FIG. 1 is a perspective view of an assist handle assembly in accordance with the present invention.

Referring now to FIG. 1, an assist handle assembly in accordance with the present invention is indicated generally at 10. The assembly 10 includes a generally C-shaped handle body 12 sized to be used for manually grasping the handle body 12 when entering or exiting the vehicle. The body 12 has a first end 14 and an opposed second end 16. A first attachment portion 18 extends from the end 14, and a second attachment portion 20 extends from the end 16. The handle body 12 is adapted to be hingedly attached to a vehicle interior surface 1, such as by hingedly attaching the free ends of the attachment portions 18 to the surface 11. Alternatively, the handle body 12 may be rigidly attached to the interior surface 11.

A light unit 22 for providing illumination to the vehicle interior (not shown) is incorporated in the handle body 12 adjacent the end 16 and the second attachment portion 20. The light unit 22 is connected to an electrical power supply (not shown) and may include a push button 24 for activating and deactivating the light unit 22. The light unit 22 can include any suitable source of light, such as a light emitting diode (LED) or an incandescent bulb. The light unit 22 also includes a transparent lens member 26 for directing the illumination to the vehicle interior. Preferably, the outer surface of the lens member 26 is mounted flush with an outer surface of the handle body 12 such that the light unit 22 has the appearance of being incorporated into the handle body 12. Thus, at least a portion of the second attachment portion 20 is defined by the transparent lens member 26. Alternatively, the outer surface of the lens member 26 extends outwardly from the outer surface of the handle body 12.

Figure 3:
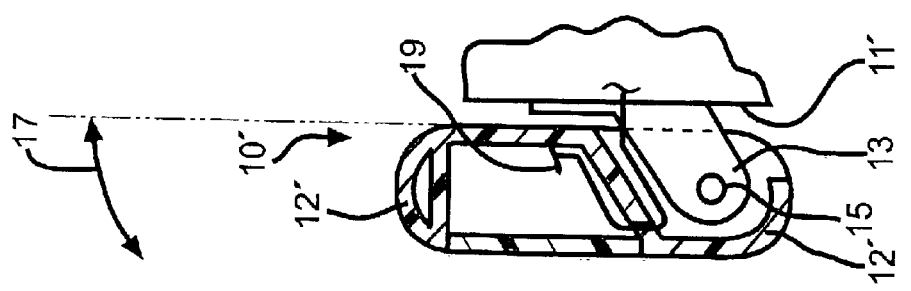
FIG. 3 is a side cross-sectional view taken along line 3—3 of FIG. 2.
Figure 2:
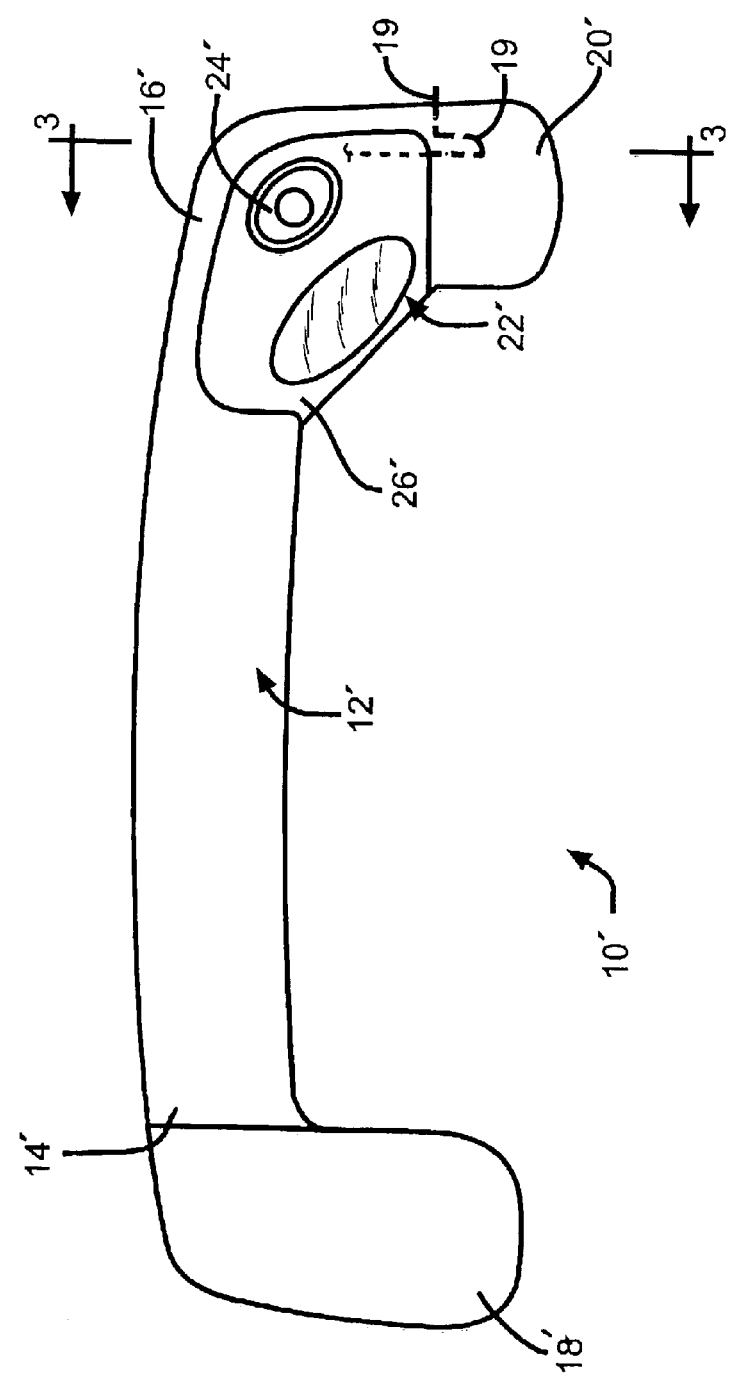
FIG. 2 is a front elevational view of an alternative embodiment of an assist handle assembly in accordance with the present invention.

Referring now to FIGS. 2 and 3, an alternative embodiment of an assist handle assembly in accordance with the present invention is indicated generally at 10'. The assist handle assembly 10' includes a handle body 12' having a first end 14' and an opposed second end 16'. A first attachment portion 18' extends from the end 14', and a second attachment portion 20' extends from the end 16'. The handle body 12' is adapted to be hingedly attached to a vehicle interior surface 11' utilizing a base connector 13 that mates with the interior surface 11' and allows the handle body 12' to hingedly move in a direction indicated by an arrow 17 about a hinge point 15, counterclockwise as viewing FIG. 2. An electrical wire 19 is routed through the base connector 13 and the handle body 12' in order to connect an electrical power supply (not shown) to a light unit 22', best seen in FIG. 3. Movement of the handle body 12' about the hinge point 15 in the direction 17 does not impair the ability of the electrical wire 19 to supply electrical power to the light unit 22'. The light unit 22' for providing illumination to the vehicle interior (not shown) is incorporated in the handle body 12' adjacent the end 16' and the second attachment portion 20'. The light unit 22' is connected to an electrical power supply by the electrical wire 19 and includes a push button 24' for activating and deactivating the light unit 22'. The light unit 22' also includes a transparent lens member 26' for directing the illumination to the vehicle interior. Preferably, the outer surface of the lens member 26' is mounted flush with an outer surface of the handle body 12'. Alternatively, the outer surface of the lens member 26' extends outwardly from the outer surface of the handle body 12'. The light unit 22' is incorporated into the handle body 12'. A portion of the second attachment portion 20' and a portion of the handle body 12' are defined by the transparent lens member 26'.

Figure 4:
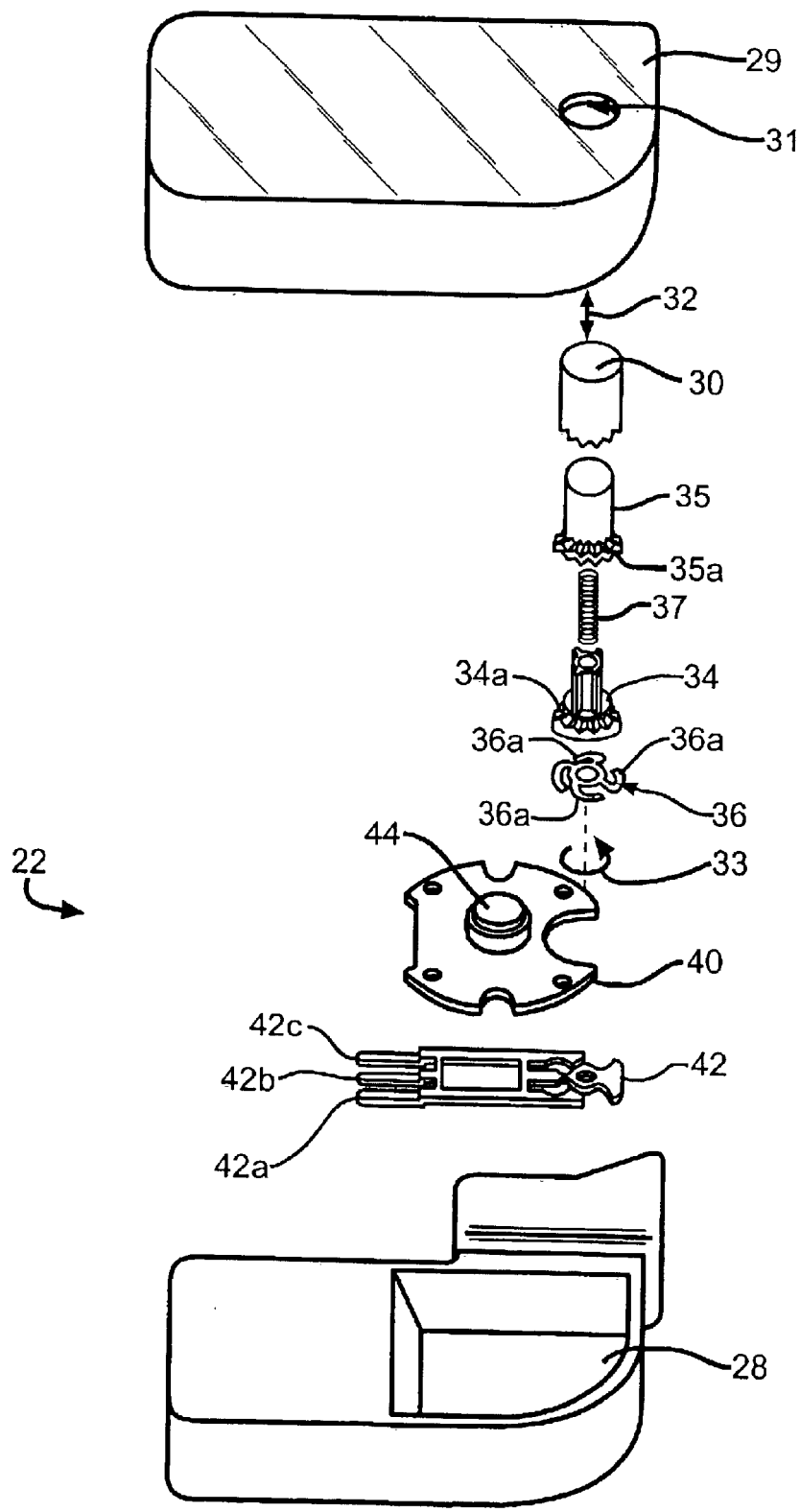
FIG. 4 is an exploded perspective view of a light assembly in accordance with the present invention.
Figure 5:
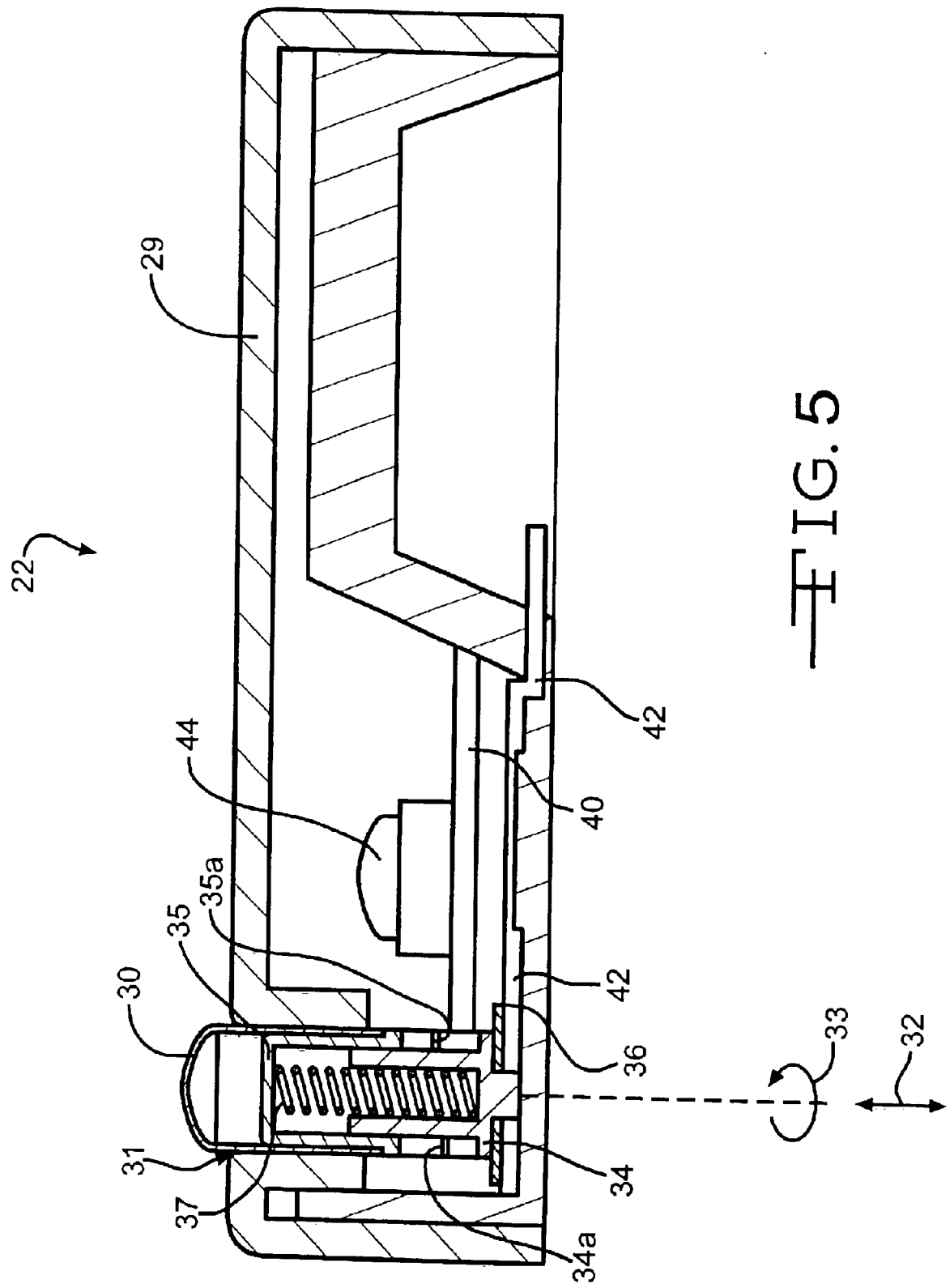
FIG. 5 is a partial cross-sectional view of the light assembly shown in FIG. 4.

Referring now to FIGS. 4 and 5, the light unit or light assembly of FIG. 1 is indicated generally at 22. The light assembly 22 is adapted to be attached to a surface, such as the surface 11 of FIG. 1, on the interior of a vehicle (not shown). Alternatively, the light assembly 22 is adapted to be incorporated in an interior vehicle accessory, such as the handle body 12 of FIG. 1. The light assembly 22 includes a housing 28 that is adapted to be attached to the interior surface or more preferably is an attachment portion of a handle body. A lens or translucent member 29 is attached to the housing 28. The housing 28 and the translucent member 29 are preferably constructed of a plastic material, or similarly electrically nonconductive material. The respective interior surfaces of the housing 28 and the translucent member 29 cooperate to form a fixed casing to contain the internal components of the light assembly 22, outlined in more detail below. A first member 30, such as the push button 24 of FIG. 1, is slidably disposed in an aperture 31 extending through the translucent member 29 and movable in a first linear direction, indicated by an arrow 32. A second or shaft member 34 is rotatably mounted relative to the housing 28 and the translucent member 29. A plunger 35 and a spring member 37 are slidably interposed between the first member 30 and the shaft member 34. A contact member 36 is fixed relative to the shaft member 34. The contact member 36 is preferably constructed of a bronze material, or similarly electrically conductive material and includes a plurality of electrical contacts 36a extending therefrom. The first member 30, the shaft 34, and the plunger 35 are preferably constructed of plastic or similar material.

A circuit board 40 for the light assembly 22 is disposed between the contact member 36 and a lead frame 42. The circuit board 40 is preferably constructed of aluminum or similar material. The lead frame 42 is connected to the contact member 36, the circuit board 40, and the housing 28. The lead frame 42 is preferably constructed of a brass material, or similarly electrically conductive material and is insert molded into the housing 28. The lead frame 42 is also connected to an electrical power supply, such as the vehicle's electrical system and/or battery (not shown). The circuit board 40 includes a light source 44 attached thereto. Preferably, the light source 44 is an LED. Alternatively, the light source 44 is an incandescent light bulb. The light source 44 is operable to provide illumination to the vehicle interior (not shown) when activated. The light source 44 includes a plurality of contacts (not shown) extending therefrom for cooperating with the contacts 36a extending from contact member 36. The contact member 36 is disposed below the circuit board 40 in a cutout portion 40a.

The lead frame 42 includes a positive contact 42a that is connected to a positive polarity or positive terminal of the vehicle battery, a negative contact 42b that is connected to a negative terminal of the vehicle battery, and an open contact 42c that is connected to the positive polarity or positive terminal of the vehicle battery. Each contact 42a, 42b, and 42c is distinct from the other. The contacts 36a of the contact member 36 form an electrical connection with the contacts 42a, 42b, and 42c of the lead frame 42 by sliding friction contact during operation of the light assembly 22, outlined in more detail below.

In general operation of the light assembly 22, reciprocal downward movement in the first direction 32 by the first member 30 causes a rotational movement of the shaft member 34 and the contact member 36 by a fixed rotational distance, thereby providing appropriate electrical contact between the contact member 36 and the lead frame 42 to activate/deactivate the light source 44. More specifically, the reciprocating movement of the first member 30 in a downward first direction 32 causes a rotational movement in the shaft member 34 in the rotating direction 33 by selective engagement of a cam surface 35a on an interior surface of the plunger 35 and a cam surface 30a on the first member 30 which cooperate with grooves 34a on an exterior surface of the shaft member 34, as best seen in FIG. 4. The cam surfaces 35a cooperate with the grooves 34a on the shaft member 34 to impart a rotational motion to the shaft member 34 from the reciprocating motion of the first member 30 in a manner similar to that of a retractable pen or the like. When the first member 30 moves downwardly, the plunger 35 also moves downwardly and compresses the spring member 37. The spring member 37 aids in returning the first member 30 in an upward motion to an extended position after it rotates the shaft member 34. At least one stop member (not shown) is located at an upper surface of the shaft member 34 to lock the shaft member 34 and the contact member 36 in place relative to the housing 28 and translucent member 29 once the first member 30 has been depressed in order to ensure that the shaft member 34 rotates only the fixed distance in the rotating direction 33.

The movement in the rotating direction 33 alternately activates and deactivates the light source 44 by alternately supplying electrical power from the electrical power source to the light source 44 through the contacts 42a, 42b, and 42c of the lead frame 42 and the contacts 36a of the contact member 36. When the light source 44 is activated, light from the light source 44 shines through the translucent member 29 and provides illumination to the vehicle interior. The contacts 36a are arranged such that the fixed rotational movement of the shaft member 34 and contact member 36 alternately completes a circuit between the positive and the negative terminals of the battery, in order to supply electrical power to the light source 44 through the contacts 42a, 42b, and 42c of the lead frame 42, the contacts 36a of the contact member 36, and the contacts of the light source 44.

The housing 28 can be shaped advantageously to fit any number of profiles including, but not limited to, the handle body 12 of FIG. 1. The contact 42c is connected to the positive terminal of the battery and is preferably operable to activate the light source 44 when a door is opened or a similar event occurs in order to provide illumination to the vehicle interior regardless of the action or location of the first member 30 or the contact member 36.

In accordance with the provisions of the patent statutes, the present invention has been described in what is considered to represent its preferred embodiment. However, it should be noted that the invention can be practiced otherwise than as specifically illustrated and described without departing from its spirit or scope. For example, while the present invention has been described as utilizing cam surfaces on the plunger 35 that cooperate with grooves on the shaft member 34 to produce rotational movement of the shaft member 34 from a reciprocating movement of the first member 30 and the plunger 35, those skilled in the art will appreciate that numerous means for producing rotational movement from a reciprocating linear movement may be utilized while remaining within the scope of the present invention.

What is claimed is:

1. An assist handle assembly for attachment to a surface of a vehicle interior, comprising:

an elongated handle body having opposed ends a pair of base connectors, one of each base connector hingedly connected to one of said opposed ends of said handle body, said pair of base connectors adapted to be fixedly attached to the surface of the vehicle interior;

a light unit carried by said handle body, said light unit operable to provide illumination to the vehicle interior; and a flexible wire electrically connected to said light unit and routed through said handle body and one of said pair of base connectors, said wire being flexible to permit said handle body to pivot relative to said pair of base connectors.

2. The assist handle assembly according to claim 1 wherein said light unit is incorporated in said handle body.

3. The assist handle assembly according to claim 1 wherein said handle body is adapted to be hingedly attached to the interior surface.

4. The assist handle assembly according to claim 1 wherein said light assembly is carried by one of said opposed ends.

5. The assist handle assembly according to claim 1 wherein said light assembly is carried by a portion of said handle body intermediate said opposed ends.

6. The assist handle assembly according to claim 1 wherein said handle body includes a translucent member adjacent said light assembly so that when said light assembly is activated, light shines through said translucent member and provides illumination to the vehicle interior.

7. The assist handle assembly according to claim 6 wherein a portion of one of said attachment portions is defined by said translucent member.

8. An assist handle assembly adapted to be attached to a surface on the interior of a vehicle, said light assembly comprising:

an elongated handle body adapted to be attached to a surface on the interior of a vehicle;

a housing connected to said handle body;

a first member slidably disposed in said housing and movable in a first linear direction;

a second member rotatably mounted relative to said housing;

a contact member fixed relative to said second member;

a light source attached to said contact member, said light source operable to provide illumination to the vehicle interior when activated; and a lead frame connected to said contact member and an electrical power supply, whereby movement in said first direction by said first member causes rotational movement of said second member and said contact member and alternately activates and deactivates said light source by alternately supplying electrical power to the light source through said contact member.

9. The assist handle assembly according to claim 8 wherein said first member is a manual push button.

10. The assist handle assembly according to claim 8 wherein said rotational movement is caused by opposing cam surfaces on said first member and said second member.

11. The assist handle assembly according to claim 8 wherein said light source is a light emitting diode.

12. The assist handle assembly according to claim 8 wherein said light source is an incandescent bulb.

13. The assist handle assembly according to claim 1 wherein said light unit includes an LED board having an LED light source attached thereto.

14. The assist handle assembly according to claim 1 wherein said light unit includes is an incandescent bulb.

15. The assist handle according to claim 8 wherein said housing is integral with said handle body.

* * * * *